No. 869,174. PATENTED OCT. 22, 1907.
M. GOLDFEIN.
TRAP FOR LIQUIDS.
APPLICATION FILED MAY 25, 1907.
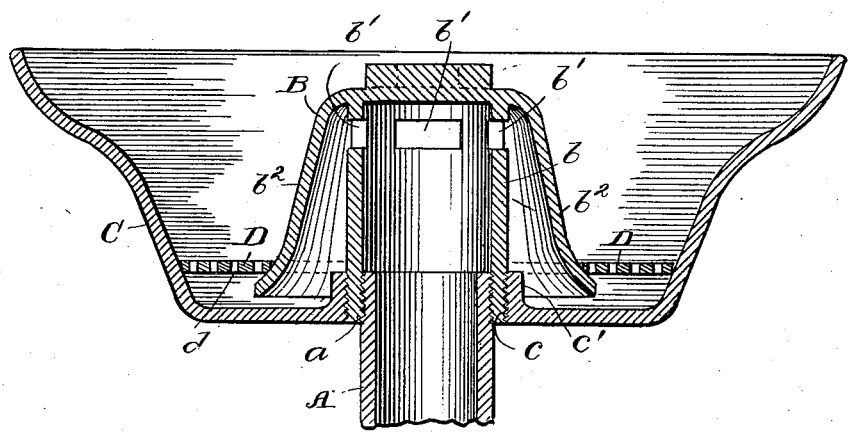
Witnesses:
Mary Israel
Jno. F. Oberlin
Inventor:
Maurice Goldfein
by J. B. Fay
his attorney.

UNITED STATES PATENT OFFICE.

MAURICE GOLDFEIN, OF CLEVELAND, OHIO, ASSIGNOR OF ONE-HALF TO THE CENTRAL BRASS MANUFACTURING COMPANY, OF CLEVELAND, OHIO, A CORPORATION OF OHIO.

TRAP FOR LIQUIDS.

No. 869,174.   Specification of Letters Patent.   Patented Oct. 22, 1907.

Application filed May 25, 1907. Serial No. 375,638.

*To all whom it may concern:*

Be it known that I, MAURICE GOLDFEIN, a citizen of the United States, and a resident of Cleveland, county of Cuyahoga, and State of Ohio, have invented a new and useful Improvement in Traps for Liquids, of which the following is a specification, the principle of the invention being herein explained and the best mode in which I have contemplated applying that principle so as to distinguish it from other inventions.

My invention, as stated, relates to improvements in traps for liquids and particularly in traps of this class designed for use in connection with refrigerators, or the like, where liquid from above requires to be received and conducted to a suitable drain.

The object of said invention, aside from the provision of a trap that shall be simple and economical in construction, is to provide one that may be readily cleansed and that at the same time can, neither by design nor by accident, be left uncovered so as to allow the obnoxious gases and vapors to escape. Such escaping sewer gas, it will be readily understood, constitutes a not infrequent source of contamination of the food exposed in refrigerators where proper precautions in the use of the traps connected therewith are not taken. The necessity of attaining security in this particular in connection with a trap designed to be used as above stated hence need not be emphasized.

To the accomplishment of the above and related ends said invention consists in means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: the single figure there appearing represents in central vertical cross section the upper end of a waste, or drain, pipe wherewith connection is to be made, and a trap embodying my improved principles of construction mounted thereon.

In such figure, A designates the waste or drain pipe in question, such waste pipe having its upper end, as at $a$, exteriorly screw threaded. The trap proper comprises two principal members, a trap member B, and an open basin or receptacle C. These two members are designed to be secured to waste pipe A in such manner that the trap member can by no manner or means be removed therefrom, without, at the same time, likewise removing receptacle C. The manner in which this result is secured will be readily apparent from the following description of the detailed construction of these two members.

Member B comprises a sleeve $b$ the lower end of which is both exteriorly and interiorly screw threaded and the upper portion of which is provided with a plurality of lateral openings or perforations $b'$. Such sleeve is surrounded by a cap $b^2$ of inverted cup-shape that is inseparable therefrom, being preferably cast integral therewith. Such cap bears a nut $b^3$ in order to enable it to be the more readily seized by a wrench or the like for purposes of rotation in assembling the several parts of the trap. Receptacle C is preferably round in contour and of the open flaring form shown, its depth being sufficient to cause it, when the parts are assembled, to laterally inclose trap member B. In the middle of the bottom of such receptacle is formed an opening $c$, preferably in an upwardly extending boss $c'$ whereby the edge of such opening is reinforced. This opening is of such a size, being furthermore screw threaded, so as to adapt it to be threaded upon the lower exteriorly threaded portion of sleeve $b$.

D designates an annular perforated plate that is designed to rest in receptacle C between its inner face and the outer face of inverted cup-shaped cap $b^2$. Such plate is thus supported at a suitable distance above the bottom of the receptacle, and the perforations $d$ therein are of such a size as to permit the ready passage of the liquid from the refrigerator or like source, but to prevent such passage in the case of larger articles such as would be apt to stop up the opening between the lower edge of the cap and the bottom of the receptacle.

The manner in which the parts above described are assembled in order to form a complete trap should be readily apparent. The basin or receptacle C is preferably first attached to the lower end of sleeve portion $b$ of trap member B and then such sleeve portion is mounted upon the end of the waste pipe A which is assumed to be already in place. Perforated plate D, being removable, may be inserted at such time as is found most convenient.

From the foregoing description it will be obvious that the parts of my improved trap are few and simple, rendering the same easy and economical of manufacture. At the same time, by virtue of the unique manner in which the parts are assembled, it will be seen that such parts may be quite easily taken apart when, owing to any of the various openings either in the pipe or in the trap member becoming clogged, such operation becomes necessary; but that, when these parts are thus separated, the trap as a whole is put out of commission. In other words, it is not possible to simply raise the bell or inverted cup of the trap member proper in order thus to cleanse the trap, but to actually unscrew such trap from its connection with the waste pipe. And since it must again be replaced in order to use the trap at all, such re-placing is not apt to be deferred or accidentally overlooked as is quite possible in the case of the ordinary trap where provision is made for cleansing, such as is here contemplated, by the simple lifting of the hinged or otherwise removably mounted cap.

Other modes of applying the principle of my invention may be employed instead of the one explained, change being made as regards the mechanism herein disclosed, provided the means stated by any one of the following claims or the equivalent of such stated means be employed.

I therefore particularly poitn out and distinctly claim as my invention:—

1. In a trap for liquids, the combination of a waste pipe, a trap member, and a receptacle, said trap member and receptacle being threaded one upon the other and upon said waste pipe so as to prevent the independent removal of said member from said receptacle.

2. In a trap for liquids, the combination of a waste pipe, a trap member threaded upon said waste pipe, and a receptacle for laterally inclosing said trap member, said receptacle being threaded upon said member whereby removal of the latter from said waste pipe independently of said receptacle is prevented.

3. In a trap for liquids, the combination of an exteriorly threaded waste pipe, a sleeve threaded thereon, the upper end of said sleeve being open, a cap of inverted cup-shape surmounting said sleeve and inseparable therefrom and an open receptacle exteriorly threaded upon said sleeve and laterally inclosing the same together with said cup.

4. In a trap for liquids, the combination of a waste pipe having its upper end exteriorly screw threaded, a sleeve mounted upon such waste pipe end and having its upper lateral portion perforated, a cap of inverted cup-shape surmounting said sleeve and integral therewith, and an open receptacle exteriorly threaded upon said sleeve and laterally inclosing the same together with said cap.

5. In a trap for liquids, the combination of a waste pipe having its upper end exteriorly screw threaded, a sleeve mounted upon such waste pipe end and having its upper lateral portion perforated, a cap of inverted cup-shape surmounting said sleeve and integral therewith, said cap bearing an integral nut on its top, a receptacle exteriorly threaded upon said sleeve and laterally inclosing the same together with said cap, and an annular perforated plate removably supported between the outer face of said cap and the inner face of said receptacle.

Signed by me, this 7th day of May, 1907.

MAURICE GOLDFEIN.

Attested by:
MARY ISRAEL,
JNO. F. OBERLIN.